United States Patent [19]

Yeater

[11] Patent Number: 4,481,127

[45] Date of Patent: Nov. 6, 1984

[54] POLYOL BLENDS

[75] Inventor: Robert P. Yeater, Moundsville, W. Va.

[73] Assignee: Mobay Chemical Corporation, Pittsburgh, Pa.

[21] Appl. No.: 520,663

[22] Filed: Aug. 5, 1983

[51] Int. Cl.$^3$ .................. C09K 3/00; H05B 33/00
[52] U.S. Cl. ........................ 252/182; 528/76
[58] Field of Search ........................ 252/182

[56] References Cited

U.S. PATENT DOCUMENTS

| | | | |
|---|---|---|---|
| 3,993,576 | 11/1976 | Barron | 252/182 |
| 4,029,593 | 6/1977 | Schapel et al. | 252/182 |
| 4,141,852 | 2/1979 | Hogan et al. | 252/182 |
| 4,415,469 | 11/1983 | Tsai | 252/182 |
| 4,436,841 | 3/1984 | Rasshofer et al. | 252/182 |

FOREIGN PATENT DOCUMENTS 95116  11/1983  European Pat. Off. .

*Primary Examiner*—A. Lionel Clingman
*Attorney, Agent, or Firm*—Gene Harsh; Joseph C. Gil

[57] ABSTRACT

The present invention is directed to a polyol blend comprising:
(a) from about 5 to about 30% by weight of a member selected from the group consisting of 1,4-butanediol, ethylene glycol, and mixtures thereof, and
(b) from about 70 to about 95% by weight of a polyester polyol produced by reacting from 10 to 60 parts by weight of adipic acid with from 40 to 90 parts by weight of a polyoxyethylene glycol having a molecular weight of from 150 to 680, the parts of adipic acid and polyoxyethylene glycol being 100, and wherein said polyester has an hydroxyl number of from about 25 to about 130, and an acid number of 2 or less.

4 Claims, No Drawings

POLYOL BLENDS

BACKGROUND OF THE INVENTION

Polyester polyols made from polyoxyethylene glycols and adipic acid are known (see, e.g., U.S. Pat. No. 3,079,350). Polyol blends, which are to be reacted with polyisocyanates, are known for use in the manufacture of shoe soles. Typical of such blends are blends of polyester polyols (derived from adipic acid and diethylene glycol) and butanediol. One problem with the blend is that it is not a single phase mixture when blended in a ratio of 86 parts polyester to 14 parts of butanediol unless it is heated to at least 60° C., which is the cloud point of the blend.

The cloud point is the temperature at which a haze or cloudiness develops when the blend is slowly cooled with stirring from a temperature sufficiently high to make the mixture a single phase. It is an object of the present invention to develop a polyol blend having a significantly lower cloud point.

DESCRIPTION OF THE INVENTION

The present invention is thus directed to a novel blend comprising:

(a) from about 5 to about 30 percent by weight of 1,4-butanediol and/or ethylene glycol (1,4-butanediol above, being preferred) and (b) from about 70 to about 95 percent by weight of a polyester polyol having an hydroxyl number of from about 25 to about 130 and preferably from about 35 to about 65, and an acid number of 2 or less and preferably 1 or less, produced by reacting from 10 to 60 parts by weight of adipic acid with from 40 to 90 parts by weight of a polyoxyethylene glycol having a molecular weight of from 150 to 680, the total parts of adipic acid and polyoxyethylene glycol being 100.

The polyoxyethylene glycols useful herein will generally be of the formula:

HO—(C$_2$H$_4$O)$_n$H$_1$ where n is at least 3 and can be as high as about 15. Such glycols will have molecular weights of from 150 to about 680.

The polyesters of the present invention are made according to known techniques. Typically, the components are reacted at temperatures of from 150 to 250° C. for a time sufficient to drop the acid number to 2 or less and preferably to 1 or less. Typically, this time will range from 12 hours to 36 hours. If desired, known esterification catalysts, such as tetrabutyltitanate can be used. The resultant polyester, which should have hydroxyl number of from about 25 to about 130 and preferably from about 35 to about 65 and acid number of 2.0 or less and preferably 1 or less, can then be blended with 1,4-butanediol, ethylene glycol, or a mixture thereof, and then used for the production of polyurethanes.

The invention is further illustrated, but is not intended to be limited by the following examples in which all parts and percentages are by weight unless otherwise specified.

EXAMPLES

Examples 1–4

The components noted in Table 1 were mixed and reacted to form polyester polyols having the hydroxyl numbers and acid numbers noted. The procedure followed in each example was identical. The polyoxyethylene glycol was charged to a reactor equipped with a mechanical agitator, a distillation column, and condenser. This glycol was heated to 110° C. at which point the adipic acid was added. Air was removed by successive evacuations and pressurizations with dry nitrogen gas. The mixture, while protected from the atmosphere with a nitrogen pad, was then heated to about 205° C. During the heating process, when the temperature reached about 145° C., water began to distill from the reaction mixture. After the mixture reached 205° C. and the distillation subsided, the pressure in the reactor was reduced to about 1 mm Hg. The reaction mass was held at these conditions until the acid number dropped to the level noted in Table 1. The viscosity and physical form at 75° C. were measured, with the results shown in Table 1. The polyols were then blended with 1,4-butanediol in weight ratios of 86:14 and the cloud points measured. Example 1 is a comparative example.

TABLE 1*

| | Composition | | | Properties | | | | Cloud Point, °C. |
|---|---|---|---|---|---|---|---|---|
| Example | AA | OE | OEMW | OH# | A# | Viscosity @ 73° C. mPa·s | Physical Form @ 75° C. | |
| 1 | 55.8 | 44.2 | 106 | 44 | 0.7 | 800 | Liquid | 60° C. |
| 2 | 46.0 | 54.0 | 150 | 55 | 0.04 | 400 | Liquid | 45° C. |
| 3 | 38.4 | 61.6 | 200 | 59 | 1.05 | 305 | Liquid | 25° C. |
| 4 | 13.9 | 86.1 | 600 | 58 | 0.77 | 205 | Solid | 20° C.*[1] |

*Explanation - The following abbreviations were used:
AA = parts by weight adipic acid
OE = parts by weight polyoxyethylene glycol
OEMW = molecular weight of the polyoxyethylene glycol
OH# = hydroxyl number, mg/KOH/g
A# = acid number, mg/KOH/g
*[1]The freezing point of the polyester was higher than the cloud point of the blend.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyol blend comprising:
   (a) from about 5 to about 30% by weight of a member selected from the group consisting of 1,4-butanediol, ethylene glycol, and mixtures thereof, and
   (b) from about 70 to about 95% by weight of a polyester polyol produced by reacting from 10 to 60 parts by weight of adipic acid with from 40 to 90 parts by weight of a polyoxyethylene glycol having a molecular weight of from 150 to 680, the parts of adipic acid and polyoxyethylene glycol being 100, and wherein said polyester has an hydroxyl number of from about 25 to about 130 and an acid number of 2 or less.

2. The blend of claim 1 wherein said polyester polyol has an hydroxyl number of from about 35 to about 65.

3. The blend of claim 2 wherein said polyester polyol has an acid number of 1 or less.

4. The blend of claim 1 wherein component (a) is 1,4-butandiol.

* * * * *